Oct. 28, 1952     D. SHAW ET AL     2,615,190
EXTENSIBLE ARM WINDSHIELD WIPER
Filed Nov. 15, 1946

INVENTOR.
Dan Shaw
BY & William Turner
James Harrison Bowen
ATTORNEY.

Patented Oct. 28, 1952

2,615,190

UNITED STATES PATENT OFFICE 2,615,190

EXTENSIBLE ARM WINDSHIELD WIPER

Dan Shaw and William Turner, New York, N. Y.

Application November 15, 1946, Serial No. 710,731

2 Claims. (Cl. 15—255)

1

The purpose of this invention is to provide an improved windshield wiper that will readily clean an entire windshield.

The invention is an extendible arm, preferably of the telescoping type with one end pivotally mounted adjacent the windshield, with the outer end held in a channel or guide extending around the inner edge of the windshield frame.

Many types of windshield wipers have been provided for cleaning different parts of the windshield, and some of these clean substantially the entire windshield, however, wherever a device is provided that extends over the whole windshield, it involves complicated apparatus and, therefore, it is desirable to construct the ordinary type of reciprocating arm generally used to support windshield wipers so that it will operate in the usual manner and at the same time extend outward to cover the ends, corners, and substantially the entire surface of the windshield as it travels backward and forward with the usual movement.

The object of this invention is, therefore, to provide a windshield wiper arm which automatically extends and contracts as it moves backward and forward across the windshield.

Another object is to provide a windshield wiper of the type having a reciprocating arm with means for readily expanding and contracting the arm to cover the entire windshield.

Another object is to provide an arm for windshield wipers having a plurality of wiping elements mounted in sliding sections which are adapted to engage the outer surface of the windshield.

Another object is to provide guiding means for the outer end of a telescoping arm of a windshield wiper which draws the arm outward in one position and causes it to contract in another position.

A further object is to provide an extending and contracting windshield wiper mounting which may readily be operated by any reciprocating device used for windshields at the present time.

And a still further object is to provide a windshield wiper with an extending and contracting arm which is of a relatively simple and economical construction.

With these ends in view the invention embodies an arm adapted to be mounted adjacent the outer surface of a windshield with reciprocating means, in which the arm comprises a plurality of segments, with wipers on the segments, and with guiding means at the outer end adapted to travel in a guide or track extending around

2 the inner edge of the ends and one side of the windshield frame, and in which the length of the are is adapted to change with the movement thereof.

Other features and advantages of the invention will appear from the following description taken in connection with the drawings, wherein.

Figure 1:
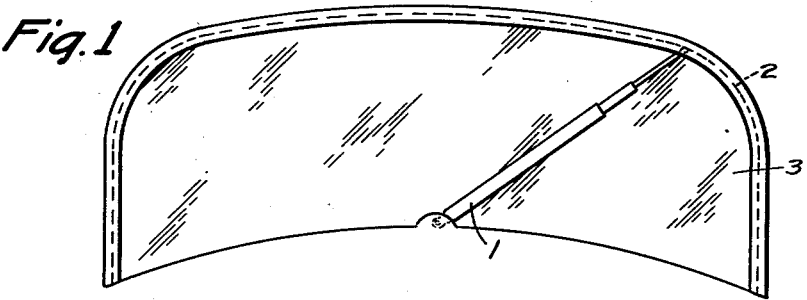
Figure 1 shows a front elevation of an automobile windshield with the device illustrated thereon.

In the drawings the device is illustrated as it may be made wherein numeral 1 indicates the telescoping arm, numeral 2 the track or channel around the border of the windshield, and numeral 3 is a windshield.

The arm 1 is formed with a connection 4 similar to the base of any windshield wiper and adapted to extend into the same mechanism, and it will be understood that this connection may be of any type or design, and may be made to correspond with a windshield wiper of any type.

Figure 4:
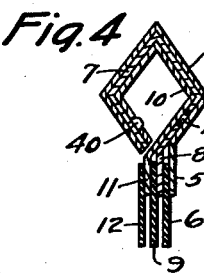
Figure 4 is a detail showing a cross section through the device shown in Figure 2.
Figure 7:
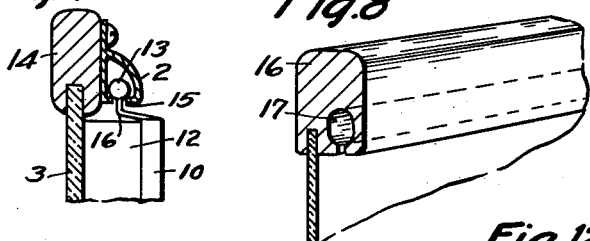
Figure 7 is a detail of a part of a windshield frame with a bead having a continuous slot for holding the outer end of the device.
Figure 8:
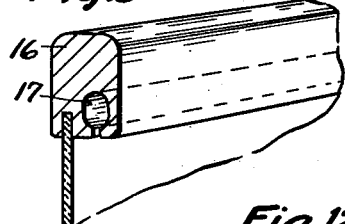
Figure 8 is a similar view showing the slot formed in the windshield frame.

The arm 1 is substantially tubular in cross section, as illustrated in Figure 4, and one side is formed with a flange 5 upon which a wiper 6 is mounted, and inside of the part 1 is a similar section 7 also having a downwardly extending flange 8 with a wiper 9 mounted thereon, and inside of the section 7 is a similar section 10 also having a flange 11 extending downward with a wiper 12 mounted thereon. On the outer end of the section 10 is a knob 13 adapted to extend into a guide 2 on the outer face of a frame 14 of the windshield 3, and this guide is provided with a continuous slot 15 in the inner surface through which an arm 16 upon which the ball or knob 13 is mounted extends, and it will be noted that, as the arm 1 is reciprocated or moved from one side to the other, the ball 13 will travel in the guide 2, drawing the sections 7 and 10 outward as it travels around the corners, and approaches the ends, and forcing the sections inward as the arm approaches the center of the windshield or vertical position. The guide or track 2 may be of any type or design, and may be attached to the outer surface of the windshield frame as illustrated in Figure 7, or may be formed in the frame as illustrated in Figure 8, in which the frame is indicated by the numeral 16 and the slot by the numeral 17. However the slot may be formed in any manner and may be of any shape or design.

Figure 3:
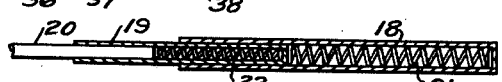
Figure 3 illustrates a similar section with parts omitted showing an alternate design.
Figure 6:
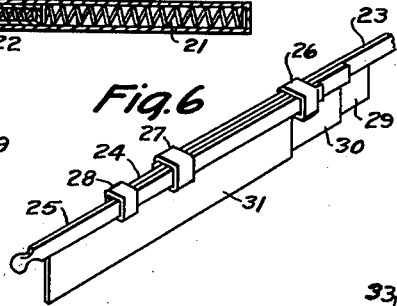
Figure 6 is a detail illustrating a plurality of sliding bars in place of the telescoping members.
Figure 10:
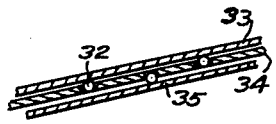
Figure 10 is a detail illustrating a method of inserting ball bearings between the telescoping or sliding members.

The arm 1 may also be of any shape, type or design, and may be provided with telescoping sections 18, 19, and 20, as shown in Figure 3, with springs 21 and 22 therein which resiliently urge the sections outward so that the knob 13 may bear against the inner edge of the windshield frame, and be forced inward at the center while at the same time permitting the length of the arm to extend as it moves toward the corners and ends; or this arm may be made of flat plates, as illustrated in Figure 6, in which bars 23, 24, and 25 are slidably held by clips 26, 27, and 28 extending partially around the bars and with the wipers 29, 30 and 31 extending downward from the bars. These bars or the telescoping members may be separated by balls 32, as illustrated in Figure 10, in which the plates, bars, or telescoping members are indicated by the numerals 33, 34, and 35. It will be understood that any number of bars or telescoping members may be provided, and these may be arranged in any manner.

In the design shown in Figure 1, the bar 10 is provided with a groove 36 into which a projection 37 of the member 7 extends, and the member 7 is provided with a slot 38 into which a projection 39 of the member 1 extends, thereby limiting the outward movement of the sections, and although these projections and slots are shown in the lower surface, it will be understood that they may be located in the sides or at any point. It will be noted in Figure 4 that a projection 40, similar to the projection 37, is provided in one side of the device, and a projection 41, similar to the projection 39, is provided in the opposite side.

Figures 9, 11:
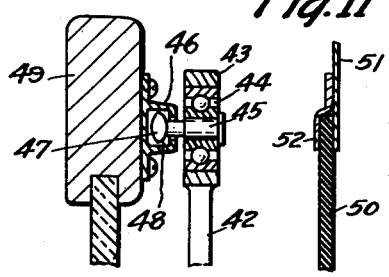
Figure 9 is a similar view illustrating another modification in which the outer end of the arm is provided with a ball bearing having a knob therein to facilitate the traveling movement thereof.
Figure 11 is a detail illustrating a method of attaching the wiper to one of the telescoping or sliding members.

In the design shown in Figure 9 the outer end 42 of the arm 1 is provided with a hub 43 having a ball bearing 44 therein, and a pin 45 is mounted in the ball bearing and provided with an extending end 46 having a knob 47 thereon that is adapted to extend into a channel or track 48 on a windshield frame 49, and it will be noted that, as the arm moves backward and forward, the knob 47 will rotate and roll very freely therein.

Figure 11 merely illustrates a possible mounting of a wiper 50 on a section 51 of a plate similar to the section 5 of the member 1, and this may be crimped between a clip 52 mounted thereon, however, it will be understood that the wipers may be secured to the telescoping sections in any manner or by any means.

Figure 12:
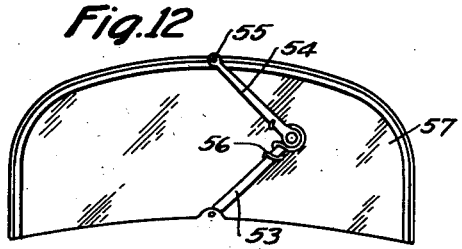
Figure 12 illustrates another modification in which a plurality of hinged levers are used in place of the telescoping arm.

In the design shown in Figure 12, the arm 1 is replaced by a plurality of levers 53 and 54 with a pin or roller 55 at the outer end, and with a spring 56 at the hinge or joint, and it will be noted that, as these levers approach the ends or corners of the windshield, the spring 56 will straighten them out, thereby providing a continuous wiping arm that extends continuously over a surface of a windshield which, in this design, is indicated by the numeral 57.

Figure 2:
Figure 2 is a longitudinal section through the device.
Figure 5:
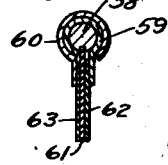
Figure 5 is a similar view with parts omitted showing a device of an alternate design.

It will be understood that the levers 53 and 54 or the small section of the arm 1, which is indicated by the numeral 10 in Figure 2, may be tubular or solid as may be desired. This section is shown solid in Figures 2 and 3, and tubular in Figure 4, and in Figure 5 it is also shown solid in which it is indicated by the numeral 58, with the intermediate section indicated by the numeral 59, and the outer section, similar to the section 1, by the numeral 60. In this design the openings in the sections are alternated, bringing the wiping strips 61, 62, and 63, substantially together.

In use the arm may be pivotally mounted in a reciprocating device in place of the usual windshield wiper arm, and may be moved backward and forward in the same manner, and, as the arm travels across the windshield with the outer end held in the guide 2, it will move inward and outward extending as it approaches the corners and ends, and contracting as it approaches the center, and, with wipers mounted along the arm, the entire outer surface of the windshield will be cleaned continuously. The device may also be located at the upper side of the windshield.

It will be seen that in all embodiments of the invention the outer end of the extensible wiper arm assembly coacts with a track which is protected from weather conditions by being located in a hollow member. The outer end of the wiper arm is provided with an extension which carries a knob or equivalent track engaging element and can move therealong without danger of icing conditions on the track. By providing a narrow entrance slot communicating with the interior of the hollow member there is little danger of snow or ice reaching the track. By having the entrance slot disposed upon the side of the hollow member at right angles to the plane of the windshield, as in the embodiments of Figs. 7 and 8, even greater protection is given against interior icing on the track.

It will be understood that other changes may be made in the construction without departing from the spirit of the invention.

What is claimed is:

1. A windshield wiper mechanism comprising a swinging and extensible wiper arm assembly having an outer end, an extension on the outer end of the wiper arm assembly, an elongated channeled member formed with an interior track, said channeled member having vertical and horizontal portions and a curved interconnecting portion, shaped to windshield marginal contour, said wiper arm end extension projecting into the channeled member and carrying an element adapted to slide along said track, and an entrance slot in the channeled member for the wiper arm end extension lying between opposing portions of the interior track, the slidable element being of larger dimension than said slot and adapted to be retained in sliding engagement with said opposing track portions.

2. A windshield wiper mechanism comprising a swinging and extensible wiper arm assembly having an outer end, an extension on the outer end, of the wiper arm assembly, an elongated channeled member formed with an interior track, said channeled member having vertical and horizontal portions and a curved interconnecting portion, shaped to windshield marginal contour, said wiper arm end extension projecting into the channeled member and carrying an element adapted to slide along said track, and an entrance slot in the channeled member through which the wiper arm end extension projects into the channeled member, said slot being located in the side of the channeled member which faces the wiper arm assembly, and lying between opposing portions of the interior track, the slidable element being of larger dimension than said slot and adapted to be retained in the channeled member in sliding engagement with said opposing track portions.

DAN SHAW.
WILLIAM TURNER.

REFERENCES CITED

The following references are of record in the file of this patent:

UNITED STATES PATENTS

| Number | Name | Date |
|---|---|---|
| 860,021 | Fesenfeld | July 16, 1907 |
| 1,325,017 | Hill | Dec. 16, 1919 |
| 1,661,236 | Sebell | Mar. 6, 1928 |
| 1,913,248 | Scott | June 6, 1933 |
| 2,185,572 | Sawyer | Jan. 2, 1940 |
| 2,393,605 | Bramhall | Jan. 29, 1946 |